(12) United States Patent
Sotelo et al.

(10) Patent No.: US 6,452,871 B1
(45) Date of Patent: *Sep. 17, 2002

(54) LUNAR TRANSIT TIMEPIECE AND APPARATUS USING THE SAME

(75) Inventors: Oscar Sotelo, 301 N. Main, Suite 1, McAllen, TX (US) 78501; Juan L. Guerrero, McAllen, TX (US)

(73) Assignee: Oscar Sotelo, McAllen, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/263,825

(22) Filed: Jun. 21, 1994

Related U.S. Application Data

(63) Continuation-in-part of application No. 07/945,906, filed on Sep. 17, 1992, now abandoned.

(51) Int. Cl.$^7$ .......................... G04B 47/00; G04F 10/00; A01K 1/10; A01K 5/02
(52) U.S. Cl. ...................... 368/10; 368/107; 119/51.11; 222/650
(58) Field of Search ........................... 368/10, 107–113; 119/51.11, 51.12, 56.1, 56.2, 57.7; 222/242, 370, 638, 639, 650

(56) References Cited

U.S. PATENT DOCUMENTS

| | | | | |
|---|---|---|---|---|
| 4,035,661 A | * | 7/1977 | Carlson | 307/141 |
| 4,834,265 A | * | 5/1989 | Snyder | 221/1 |
| 4,981,107 A | * | 1/1991 | Beaudoin et al. | 119/56.2 |
| 4,993,002 A | * | 2/1991 | Kerr | 368/19 |
| 5,143,289 A | * | 9/1992 | Gresham et al. | 239/7 |
| 5,160,068 A | * | 11/1992 | Fishman et al. | 222/352 |

OTHER PUBLICATIONS

Caller–Times article, Apr. 30, 1992 New hunting and fishing aid debuts Friday.

Texas Parks and Wildlife article dated May 1992, pp. 20–25 Big bass respond to solunar dinner bell.

* cited by examiner

*Primary Examiner*—Vit Miska
(74) *Attorney, Agent, or Firm*—G. Turner Moller

(57) ABSTRACT

A timer produces a signal on an output at lunar transit time and at one half daily lunar cycle past lunar transit time. The timer is connected to a feeder to distribute feed to wild or domestic animals such as mammals, fish or birds. The timer includes a crystal oscillator and means for counting the oscillations.

14 Claims, 1 Drawing Sheet

LUNAR TRANSIT TIMEPIECE AND APPARATUS USING THE SAME

Figure 1:
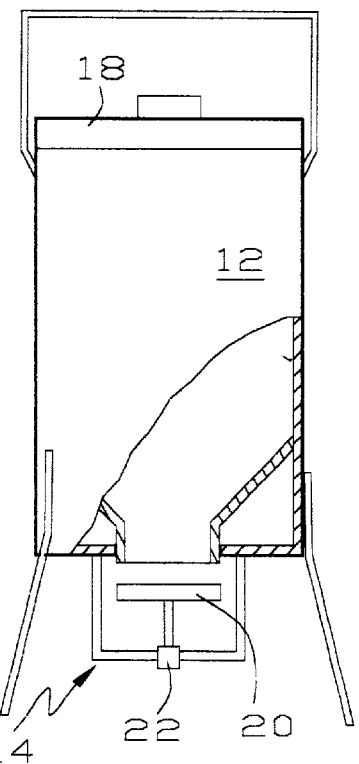

This application is a continuation-in-part of application Ser. No. 07/945,906, filed Sep. 17, 1992, abandoned.

This invention relates to a lunar transit timepiece and an apparatus using the device.

Lunar transit time is the time when the moon is at its highest point in the sky. Thus, the lunar transit time is analogous to noon, which is the time when the sun is at its highest point in the sky. It will be seen that the lunar transit time varies across the face of the earth. It will also be apparent that the moon is not necessarily directly overhead at lunar transit time. Instead, the moon is merely at its highest point in the sky. Because our normal timekeeping systems are based on sun time, elaborate calculations are needed to convert sun time into a table providing lunar transit times.

There is some evidence to suggest that animal activity, e.g. deer or fish feeding, is at a maximum at lunar transit time and when the moon is directly on the opposite side of the earth, i.e. when the earth has rotated 180° relative to the moon. See The Corpus Christi Caller Times, page C3, Thursday, Apr. 30, 1992.

The provision of timepieces which indicate high and low tides and the like are found in U.S. Pat. Nos. 3,708,971; 4,412,749; 4,993,002; 5,050,139; 5,086,416 and 5,086,417. The provision of automated fish feeders are found in U.S. Pat. Nos. 4,922,856 and 4,967,697.

As used herein, the term daily lunar cycle means the period during which the moon completes one complete revolution about the earth. This is in contrast to the monthly lunar cycle where the moon goes through phases of being more and less visible from the earth.

This invention comprises a timer which provides an output at lunar transit time and one half daily lunar cycle later. In accordance with one embodiment of the invention, the timer includes an oscillator and a counter. When the time interval corresponding to one half a daily lunar cycle elapses, an output signal is delivered from the timer. The timer is preferably started at lunar transit time so each output signal occurs at lunar transit time and one half daily lunar cycle later.

If one analyses a table of lunar transit times, one sees that the times vary in an apparently unknown manner. Further study shows that the time of each lunar transit falls more than twenty four hours later than the previous lunar transit. This shift of lunar transit time varies between forty and sixty minutes and averages about 51.2 minutes. Thus, on the average, each lunar transit time occurs twenty four hours 51.2 minutes later than the previous lunar transit time. Thus, on average, one half lunar transit time falls 12 hours 25.6 minutes later than the previous lunar transit time. In a practical sense, the timer of this invention does not have to provide an output exactly at lunar transit time because an approximation will suffice in almost all situations. Thus, using averages of about twenty four hours, 51 minutes and twenty four hours 25 or 26 minutes works quite well.

It is an object of this invention to provide a timer for indicating lunar transit time or a time related to lunar transit time.

Another object of this invention is to provide a feeder or similar device which is energized at or near lunar transit time.

These and other objects of this invention will become more fully apparent as this description proceeds, reference being made to the accompanying drawings and appended claims.

IN THE DRAWINGS

Figure 2:
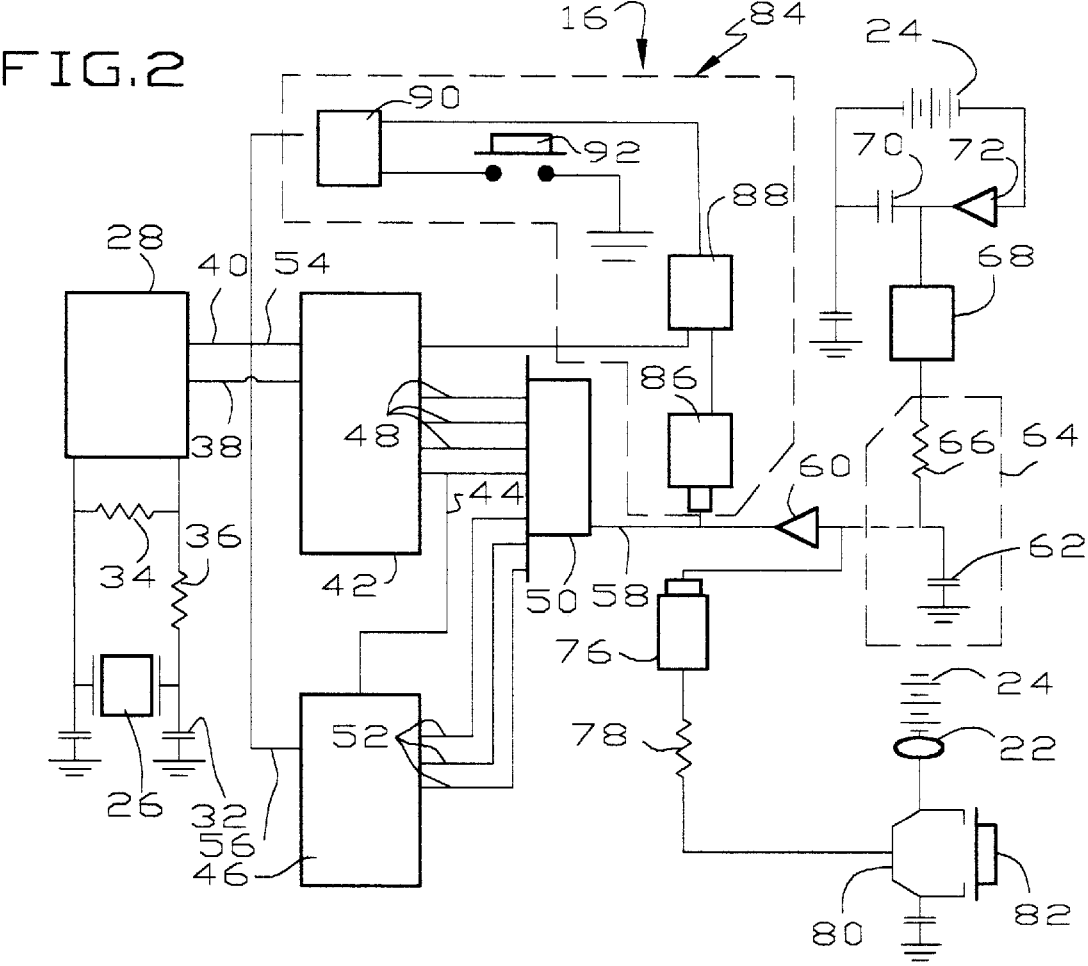

FIG. 1 is a schematic view of an animal or fish feeder equipped with a timer of this invention; and FIG. 2 is a circuit diagram of a timer used in the feeder of FIG. 1.

Referring to FIG. 1, a feeder 10 of this invention comprises, as major components, a hopper or container 12 of feed, a mechanism 14 for discharging feed from the hopper 12 and a timer 16 for periodically energizing the mechanism 14. The hopper 12 and discharge mechanism 14 may be of any suitable type for feeding animals of all type including fish, birds, game animals such as deer, domesticated animals or the like.

Typically, the hopper 12 includes a removable lid 18 for charging the hopper with a quantity of granular feed and is hung from a tree, supported by a stand or by a float in any suitable manner. The dispensing mechanism 14 includes a broadcasting disc 20 driven by an electric motor 22 for starting, broadcasting and then stopping flow of feed from the hopper 12. A battery 24 energizes the electric motor 22 at predetermined intervals by the timer 16. Those skilled in the art will recognize that the broadcasting disc 20 is positioned so close to the discharge opening that stopping the motor 22 causes granular feed from the hopper to pile up on the disc 20 and stop flowing through the hopper discharge. The battery 24 may be of any suitable type, such as a conventional 6 volt lead-acid vehicular type battery. As heretofore described, the feeder 10 is a conventional device, as will be recognized by those skilled in the art.

The timer 16 delivers an output signal to energize the motor 22 at lunar transit time and at one half lunar cycle past lunar transit time. As shown in FIG. 2, the timer 16 preferably includes a crystal oscillator 26 oscillating at a predetermined frequency, e.g. 32.786 KhZ. An integrated circuit 28 is connected to the oscillator 26 through a network of grounded capacitors 30, 32 and resistors 34, 36 and is a counter to convert the oscillations of the oscillator 26 into pulses at predetermined intervals. Conveniently, the integrated circuit 28 is a fourteen stage ripple counter designed to deliver a clock pulse on an output 38 every one half second. The integrated circuit 28 also includes a reset input 40 as will be explained more fully hereinafter.

The output 38 connects to a second integrated circuit 42 having an output 44 connected to a third integrated circuit 46 and a plurality of outputs 48 connected to a fourth integrated circuit 50 which conveniently is an eight input NAND gate. The integrated circuit 46 also includes a plurality of outputs 52 connected to the integrated circuit 50. The integrated circuits 42, 46 accordingly count the clock pulses from the integrated circuit 28 and deliver a plurality of outputs to the circuit 50. Conveniently, the integrated circuits 42, 46 are twelve stage ripple counters. Because the timer 16 is designed to deliver an output signal at lunar transit time and at a time one half daily lunar cycle past lunar transit time, the circuits 42, 46 are designed to complete all of the output signals through the outputs 44, 48, 52 when the number of pulses received from the circuit 28 equals one half daily lunar cycle which is, on average, twelve hours 25.6 minutes or twelve hours twenty five minutes thirty six seconds. The integrated circuits 42, 46 also include reset inputs 54, 56 for purposes more fully explained hereinafter. The timer 16 may be set to provide an output signal only at lunar transit time which is, on average, twenty four hours 51.2 minutes than the previous lunar transit time.

When the integrated circuit 50 receives all the necessary inputs from the circuits 42, 46, the voltage on the output 58 drops allowing a diode 60 to conduct thereby discharging a capacitor 62 in a delay circuit 64 having a resistor 66 connected to a voltage control circuit 68. The circuit 68 is of conventional design and is located between the battery 24 and the timer circuit 16 to provide a steady voltage source in the event the motor 22 draws down the voltage delivered by the battery 24 below a predetermined desired value. The circuit 68 is connected to the battery 24 through a capacitor 70 and a diode 72 in a conventional manner.

While the capacitor 62 is recharging, the motor 22 is turned on to drive the broadcasting disc 20. To this end, an integrated circuit 76 connects to the delay circuit 64 and inverts and buffers the signal coming from the capacitor 62. Conveniently, the integrated circuit 76 is a device known as a quad two input NAND gate. A resistor 78 connects the integrated circuit 76 to a transistor 80 causing it to conduct so the electric motor 22 is driven by the battery 24. As soon as the capacitor 62 recharges, the motor 22 stops. A switch 82 in parallel with the transistor 80 allows the motor 22 to be run for testing purposes or to distribute feed on demand.

A reset circuit 84 resets the integrated circuits 28, 42, 46 to start operation again. To this end, the reset circuit 84 includes a first gate 86 connected to the circuit output 58 and a second gate 88 connected to the integrated circuit 42 and to a third gate 90. The third gate 90 connects to the reset inputs 40, 54, 56 of the integrated circuits 28, 42, 46 and act to reset all of the counters to zero. The integrated circuits 28, 42, 46 accordingly start counting again until one half daily lunar cycle is completed when the capacitor 62 again discharges and the motor 22 momentarily runs. It will be seen that the reset circuit 84 resets the circuits 28, 42, 46 immediately when the voltage on the output 58 drops. Thus, the motor 22 runs while the counters in the circuits 28, 42, 46 have already begun counting the next cycle.

The reset circuit 84 includes a manual reset or start switch 92 for manually setting the integrated circuits 28, 42, 46 to zero. Those skilled in the art will recognize that the integrated circuit 76 and the gates 86, 88, 90 may comprise a single four part integrated circuit.

The following values, part numbers or designations for the components of the timer 16 may be of value in understanding the timer 16:

| C30 | 10 pf | 10 pf ceramic disc capacitor |
| C32 | 39 pf | 39 pf ceramic disc capacitor |
| C62 | 10R63 | 10 uF radial elec. capacitor |
| C70 | 1000R16 | 1000 UF radial elec. capacitor |
| R34 | R15M | 15 M ohm resistor |
| R36 | R330K | 330K ohm resistor |
| R66 | R1M | 1.0 M ohm resistor |
| IC28 | 74HC4060 | 14 stage ripple carry counter |
| IC42 | 74HC4040 | 12 stage ripple carry counter |
| IC46 | 74HC4040 | 12 stage ripple carry counter |
| IC50 | 74HC30 | 8 input NAND gate |
| IC70 | 74HC00 | quad 2 input NAND gate |
| Q74 | TIP120 | NPN power Darlington transistor. |

To start the timer 16, the manual reset switch 92 is depressed at lunar transit time. This resets the integrated circuits 28, 42, 46 so the next time the motor 22 runs is one half daily lunar cycle past lunar transit time. Thereafter, the timer 16 automatically resets. It will be apparent that means may be provided for setting the timer 16 so the manual reset switch 92 does not have to be depressed at exactly lunar transit time.

Although this invention has been disclosed and described in its preferred forms with a certain degree of particularity, it is understood that the present disclosure of the preferred forms is only by way of example and that numerous changes in the details of construction and operation and in the combination and arrangement of parts may be resorted to without departing from the spirit and scope of the invention as hereinafter claimed.

We claim:

1. A timer comprising an output; and means for producing a series of signals on the output at a predetermined relation to lunar transit time including means for setting an original time for a signal and means for setting an interval between signals, the interval between signals being about twenty four hours fifty one minutes.

2. The timer of claim 1 wherein the interval is twenty four hours 51.2 minutes.

3. The timer of claim 1 further comprising means producing a signal on the output at a time one half daily lunar cycle past lunar transit time.

4. The timer of claim 3 wherein the signal producing means comprises an oscillator, means for counting oscillations of the oscillator and means responsive to the counting means for producing the signal every one half daily lunar cycle.

5. The timer of claim 4 further comprising means for resetting the counting means at the end of each one half daily lunar cycle.

6. The timer of claim 5 further comprising means for manually resetting the counting means.

7. A timer comprising an output; and means for producing a series of signals on the output at a predetermined relation to lunar transit time including means for setting an original time for a signal and means for setting an interval between signals, the interval between signals being about twelve hours twenty five minutes.

8. Apparatus for automatically dispensing feed, comprising a hopper for holding a quantity of feed;

means for dispensing feed from the hopper; and means for periodically actuating the dispensing means including a timer comprising an output connected to the dispensing means and means for producing a series of signals on the output at a predetermined relation to lunar transit time including means for setting an original time for a signal and means for setting an interval between signals, the interval between signals being about twenty four hours fifty one minutes.

9. The apparatus of claim 8 wherein the actuating means further including means for actuating the dispensing means at one half daily lunar cycle past lunar transit time.

10. The apparatus of claim 9 wherein the actuating means comprises an oscillator, means for counting oscillations of the oscillator, means responsive to the counting means for producing a signal every one half daily lunar cycle, the actuating means being responsive to the signal.

11. The apparatus of claim 10 further comprising means for resetting the counting means at the end of each one half daily lunar cycle.

12. The apparatus of claim 11 further comprising means for manually resetting the counting means.

13. Apparatus for automatically dispensing feed, comprising
- a hopper for holding a quantity of feed;
- means for dispensing feed from the hopper; and
- means for periodically actuating the dispensing means including a timer comprising an output connected to the dispensing means and means for producing a series of signals on the output at a predetermined relation to lunar transit time including means for setting an original time for a signal and means for setting an interval between signals, the interval between signals being about twelve hours twenty five minutes.

14. The apparatus of claim 13 wherein the interval is about twelve hours 25.6 minutes.

* * * * *